United States Patent Office 2,707,224
Patented Apr. 26, 1955

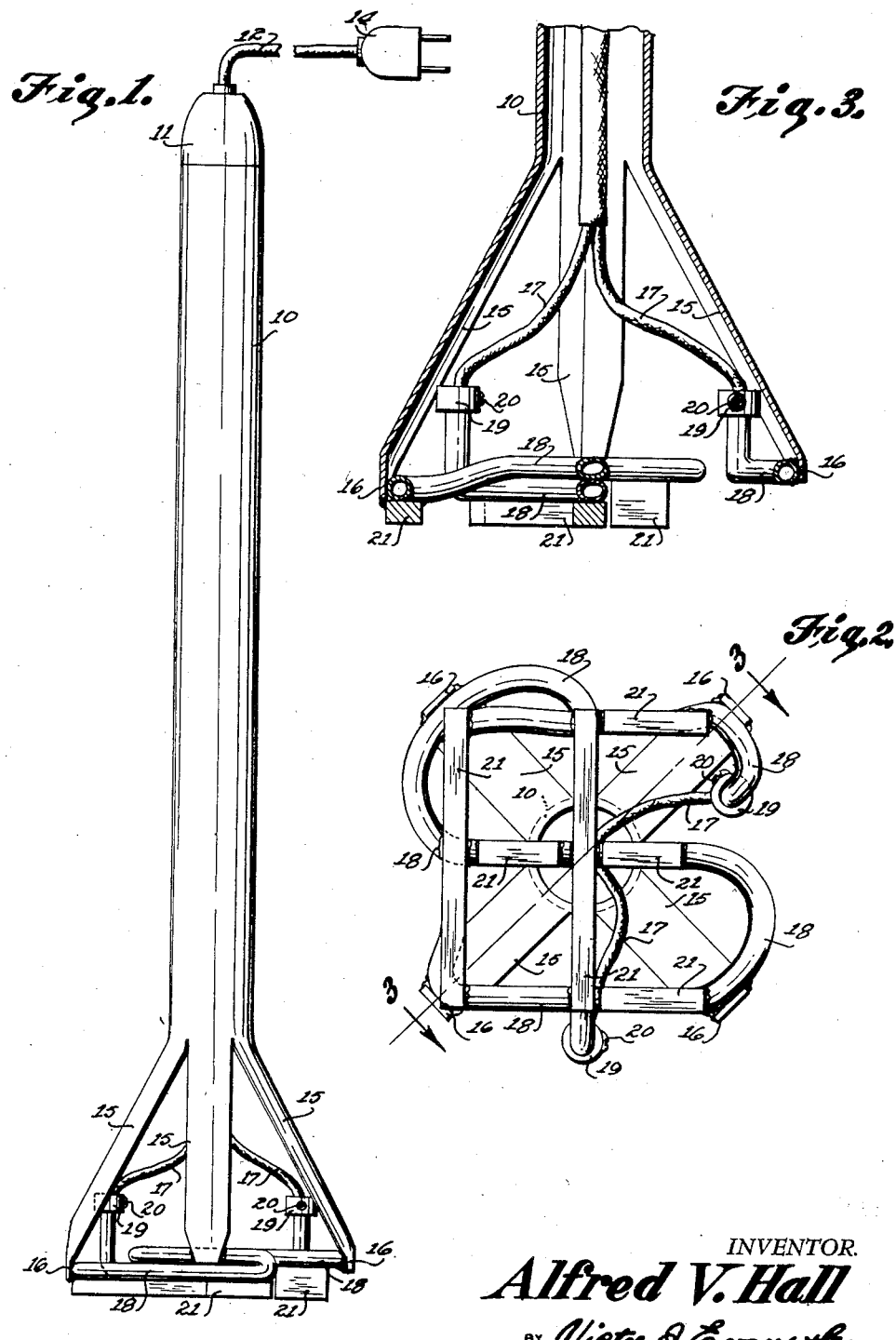

2,707,224

ELECTRIC BRANDING IRON

Alfred V. Hall, Jerome, Idaho

Application May 15, 1953, Serial No. 355,343

2 Claims. (Cl. 219—30)

This invention relates to a branding iron, and more particularly to an electrically operated branding iron.

The object of the invention is to provide a branding iron which will facilitate the branding of cattle, livestock and the like.

Another object of the invention is to provide an electric branding iron for the branding of cattle and livestock which may be operated from standard A. C. electrical current and wherein the heat is supplied by a chromolox element, and wherein the heat intensity of the heating element can be varied by installing various different chromolox elements, the branding surface including a plurality of copper bars which are shaped in the form of the brand desired and welded onto the chromolox unit.

Still another object of the invention is to provide an electric branding iron which includes a heating unit that is bent in such a form so as to provide a heating surface for all portions of the branding surface whereby there will be an actual heat supply to each part of the branding surface and wherein the branding surface can be shaped as desired, the branding iron of the present invention being light in weight.

A further object of the invention is to provide an electric branding iron which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the electric branding iron, constructed according to the present invention.

Figure 2 is a bottom plan view of the electric branding iron.

Figure 3 is a sectional view taken on the line 3—3 of Figure 2.

Referring in detail to the drawings, the numeral 10 designates an elongated handle which may be fabricated of any suitable material such as metal, and mounted on one end of the handle 10 is a cap 11 which may be removed from the handle when desired. The cap 11 may be a commercial cap or plug, and the cap 11 may have an electric wire 12 leading therefrom to a plug 14 whereby the branding iron of the present invention can be connected to a suitable source of electrical energy.

The other end of the handle 10 is shaped to provide a plurality of converging spaced apart arms or braces 15 which have their free ends bent slightly as at 16. Wires 17 extend longitudinally through the handle 10, and the wires 17 lead to a heating element 18 which may be of the chromolox type. The heating element 18 may be connected to the wires 17 by suitable set screws 20 which extend through collars 19.

Arranged contiguous to the outer surface of the heating element 18 and secured thereto in any suitable manner, as for example by welding, are branding elements 21 which are preferably fabricated of copper. It will be seen that the branding elements 21 are shaped to the desired configuration or representation, and the tubular heating element 18 is also bent or shaped to conform to the shape of the branding elements 21. These parts may be secured to each other and to the arms 15 as by welding.

From the foregoing, it is apparent that an electric branding iron has been provided which will facilitate the branding of cattle, livestock and the like. In the present invention the actual branding surface consists of copper rods 21 which are bent in order to provide the desired design so that complex brands which are common in the Western States among beef raisers can be made in one unit from the copper rods. Thus, multiple piecemeal branding operations or changing of heads will be eliminated. Furthermore, due to the conductivity of the copper rods 21 there will be a high efficiency of heat transfer between the heating unit 18 and the rods 21 and the copper rods can be bent into any desired angular or arcuate formation. Also, the intensity of the heat generated can be controlled by the wattage of the heating unit 18 that is installed in the branding iron. This is important particularly in the Western States where large herds of cattle are left on the open range during the winter and consequently develop a tremendously heavy coat so that more heat is required to penetrate through this coat and leave a brand than is required to brand cattle that have been kept in barns and other protected places and consequently have developed a much lighter coat. Thus, the prospective purchaser need only specify the approximate density of coat on the animal, and the branding iron in the present application can be given the proper heat intensity to function adequately. The branding iron can be operated from standard A. C. electrical current, and the heat is supplied by the chromolox element 18 and after manufacture, the particular unit 18 has one fixed intensity level determined by the wattage of the unit installed. The bars 21 are heated by radiation from the chromolox unit 18 which is molded to roughly conform to the brand desired.

The cap 11 may be detachably connected to the handle 10 and the heating unit 18 is bent in such form as to provide a heating surface for all portions of the branding surface 21. Thus, after the heating unit 18 has been bent in the described manner, the copper bars 21 are then welded to it in the actual shape of the brand to constitute the actual branding surface. Thus, there will be supplied heat to each part of the branding surface and the copper bars 21 can be shaped as desired.

I claim:

1. In a branding iron, an elongated handle, a cap mounted on an end of said handle and adapted to be connected to a source of electrical energy, a plurality of diverging arms extending from the other end of said handle, electric wires extending longitudinally through said handle and having one end connected to said cap, heating elements secured to said arms and electrically connected to said wires, and branding members of copper arranged contiguous to the outer surface of said heating elements and secured thereto, said arms being formed integral with said handle, the free ends of said arms being arranged angularly with respect to said arms, the free ends of said arms lying in planes parallel to the longitudinal axis of said handle, the free ends of said arms being secured to said heating elements, the outer edges of said free ends lying in the same plane, said branding members being positioned beyond the outer edges of the angularly arranged ends of said arms.

2. In a branding iron, an elongated handle, a cap mounted on said handle and adapted to be connected to a source of electrical energy, a plurality of arms extending from said handle, electric wires extending through said handle and connected to said cap, heating elements secured to said arms and electrically connected to said wires, and branding members of copper arranged contiguous to the outer surface of said heating elements and secured thereto, the free ends of said arms being arranged angularly with respect to said arms, the free ends of said arms being secured to said heating elements, the outer edges of said free ends lying in the same plane, said branding members being positioned beyond the outer edges of the angularly arranged ends of said arms.

References Cited in the file of this patent

UNITED STATES PATENTS

| | | |
|---|---|---|
| 1,323,504 | Turner | Dec. 2, 1919 |
| 1,850,280 | Haynes | Mar. 22, 1932 |
| 1,855,475 | Covey | Apr. 26, 1932 |
| 1,956,016 | Flothow | Apr. 24, 1934 |
| 2,455,410 | Farrar | Dec. 7, 1948 |
| 2,488,477 | Rapaport | Nov. 15, 1949 |
| 2,514,618 | Ancell | July 11, 1950 |
| 2,541,214 | Davis | Feb. 13, 1951 |